Sept. 27, 1960
P. N. SMITH ET AL
2,953,893
APPARATUS FOR PRODUCING YARN
Filed March 2, 1956
6 Sheets-Sheet 2
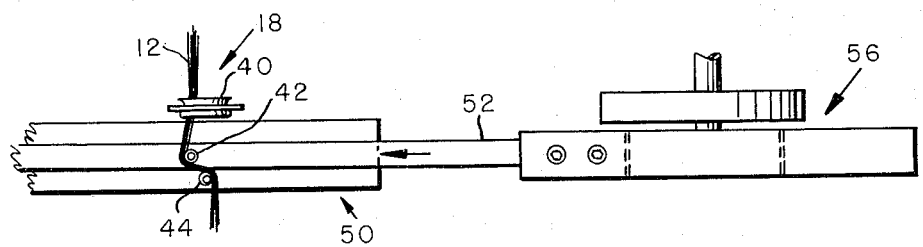
FIG. -2-
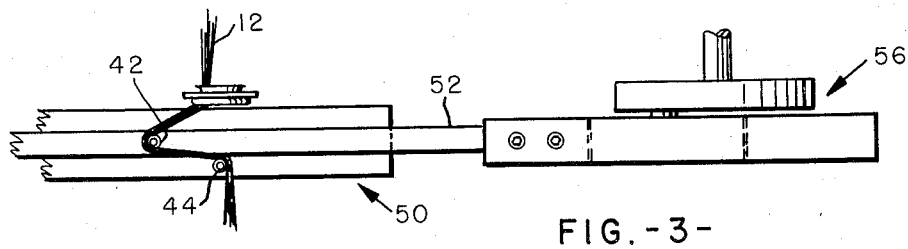
FIG. -3-
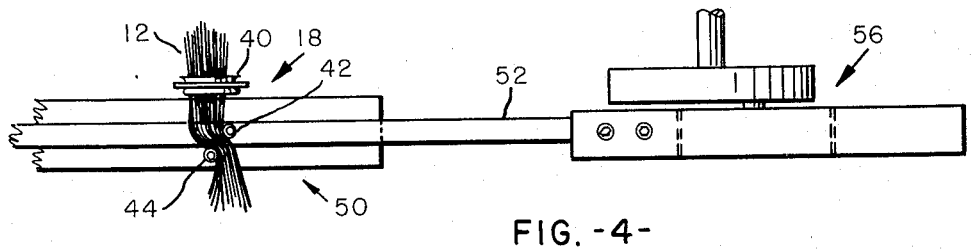
FIG. -4-
*INVENTORS*
PHILIP N. SMITH
ALBERT D. HARMON
BY *Walter E. Mueller*
ATTORNEY Sept. 27, 1960 P. N. SMITH ET AL 2,953,893
APPARATUS FOR PRODUCING YARN
Filed March 2, 1956 6 Sheets-Sheet 3
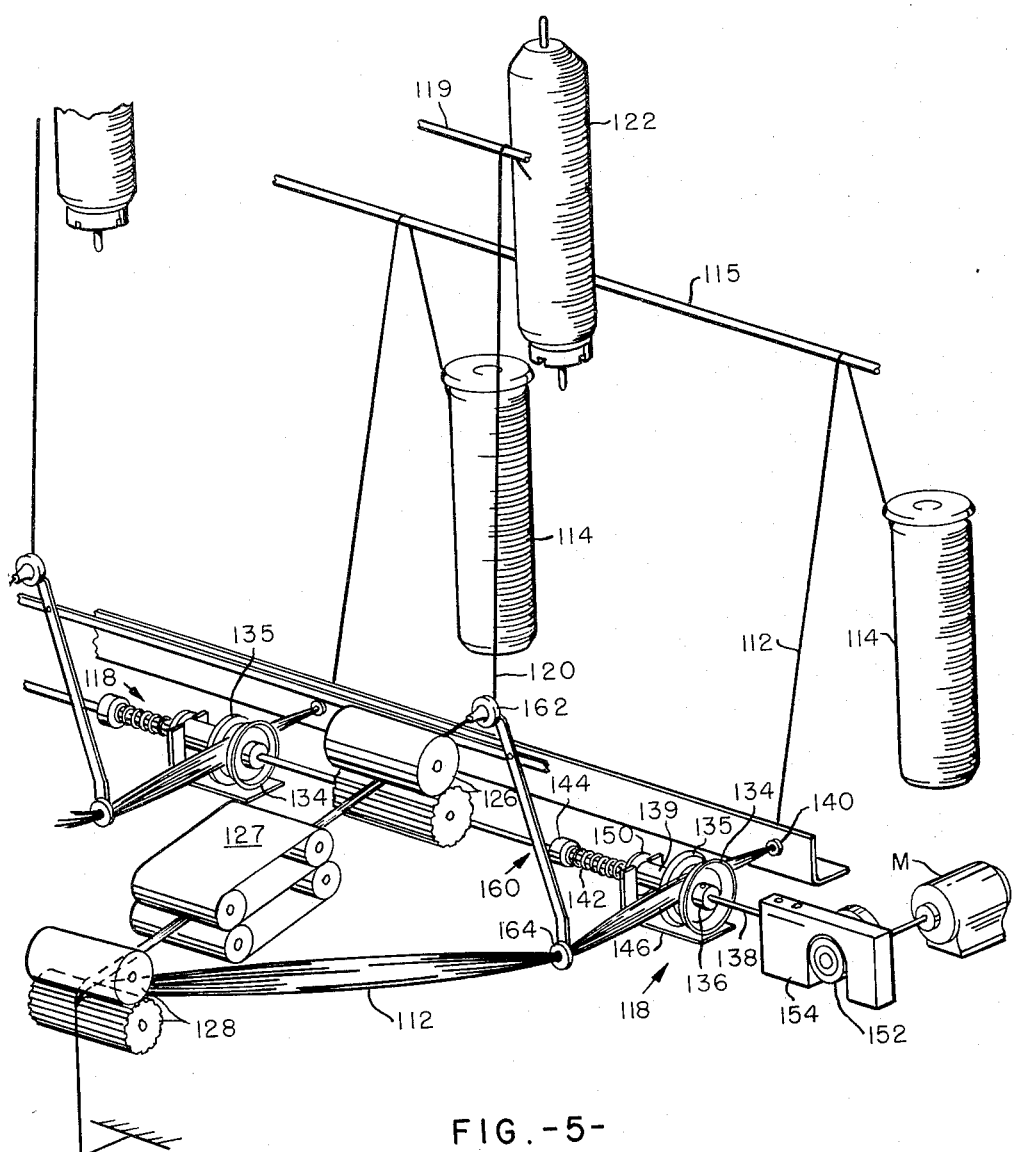
FIG.-5-
INVENTORS
PHILIP N. SMITH
ALBERT D. HARMON
BY Walter E. Mueller
ATTORNEY

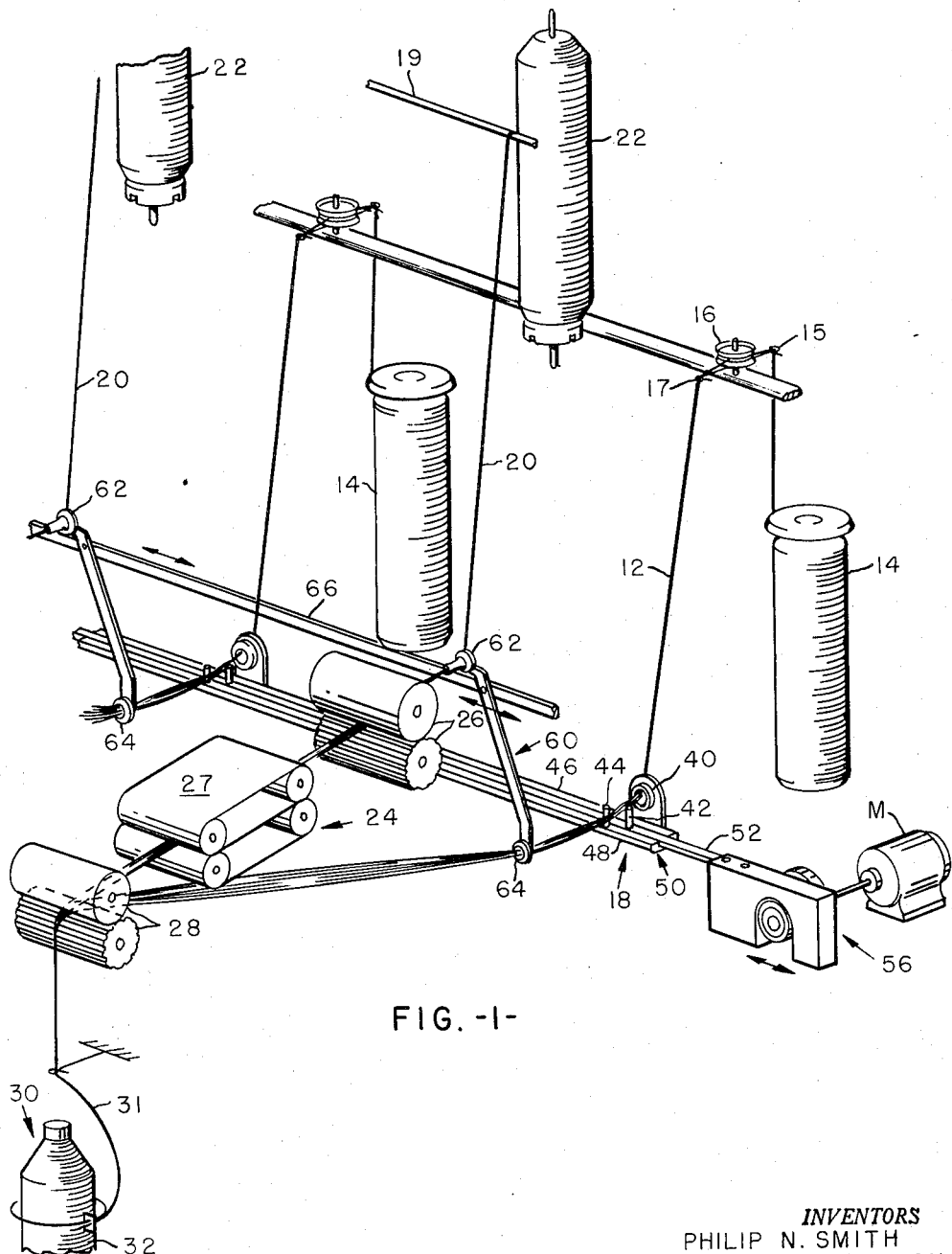
FIG.-1-

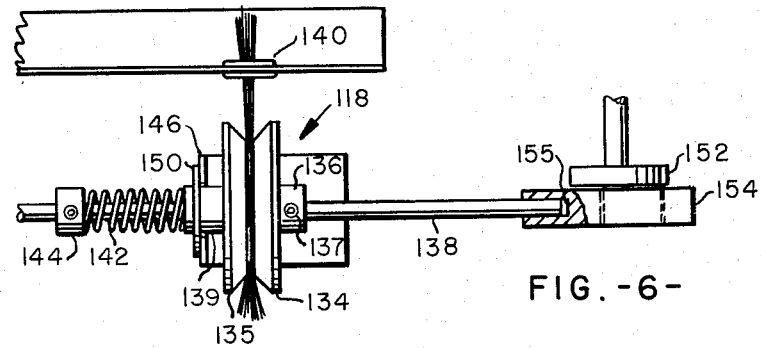
FIG.-6-
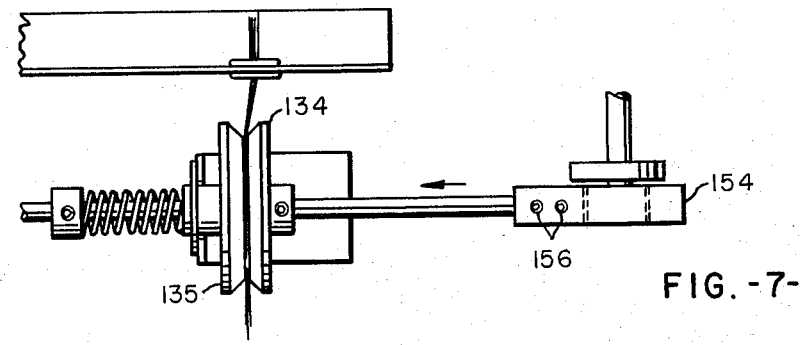
FIG.-7-
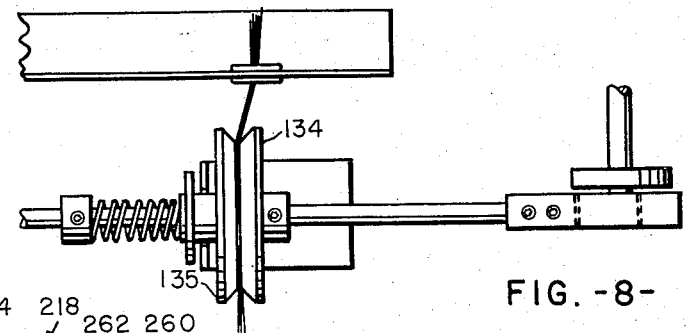
FIG.-8-
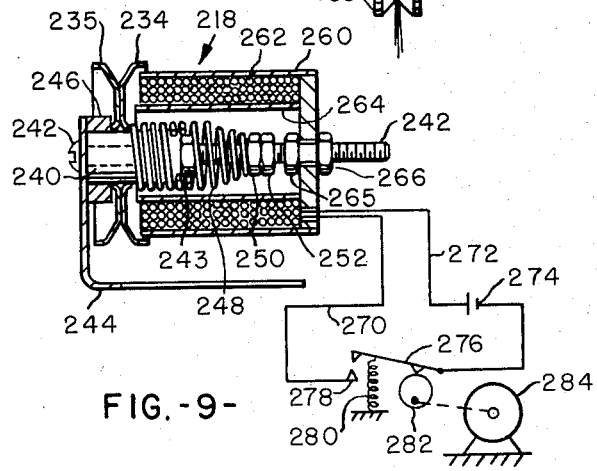
FIG.-9-

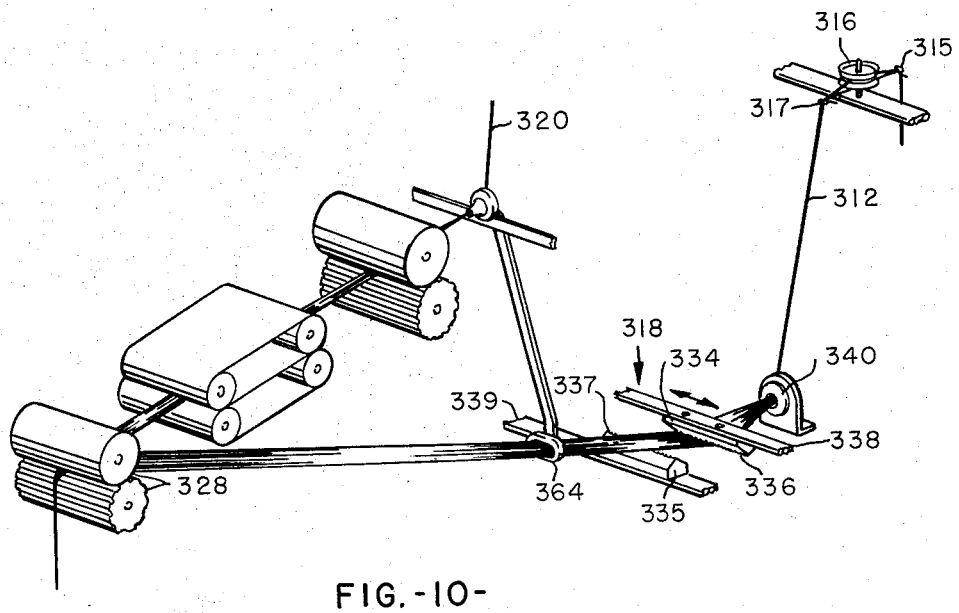
FIG.-10-
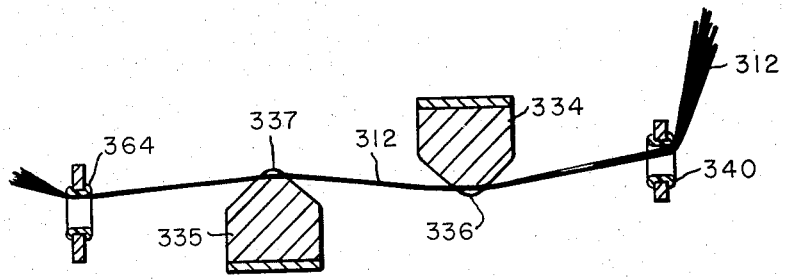
FIG.-11-

Sept. 27, 1960 P. N. SMITH ET AL 2,953,893
APPARATUS FOR PRODUCING YARN
Filed March 2, 1956 6 Sheets-Sheet 6
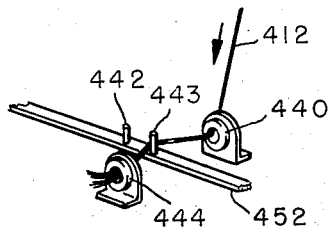
FIG. -12-
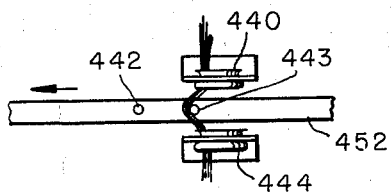
FIG. -13-
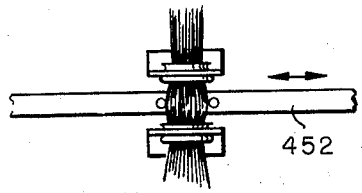
FIG. -14-
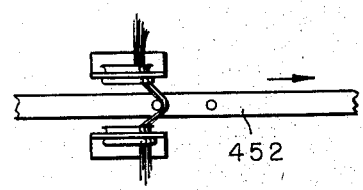
FIG. -15-
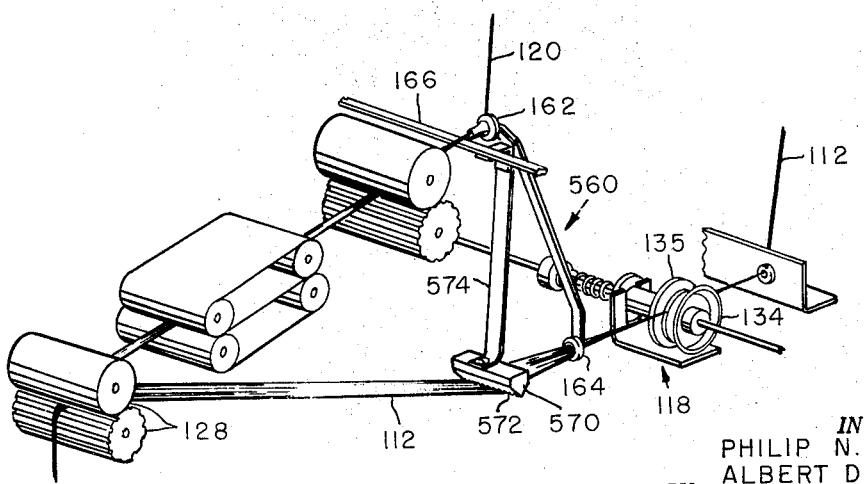
FIG. -16-
INVENTORS
PHILIP N. SMITH
ALBERT D. HARMON
BY
Walter E. Mueller
ATTORNEY

United States Patent Office

2,953,893
Patented Sept. 27, 1960

---

2,953,893

APPARATUS FOR PRODUCING YARN

Philip N. Smith, Clemson, and Albert D. Harmon, Pendleton, S.C., assignors to Deering Milliken Research Corporation, near Pendleton, S.C., a corporation of Delaware Filed Mar. 2, 1956, Ser. No. 569,164

28 Claims. (Cl. 57—36)

This invention relates to an improved method and apparatus for opening continuous filament yarn and forming a composite twisted yarn including said continuous filaments.

In a co-pending application, Serial Number 456,419 filed September 16, 1954, by John W. Hicks, now Patent Number 2,825,199, there is disclosed a system of generic character similar to that of the present invention, wherein continuous filament yarn is moved past, and in intermittent contact with, a portion of a member having a contact surface of material spaced in the triboelectric series from the filament material, said member being moved in a rotary path to yield said intermittent contact and charge the filaments of the yarn and to likewise intermittently displace the yarn transversely to its normal path and permit relaxation of the yarn whereupon the filaments, each having a like electrostatic charge, repel each other and tend to separate one from the other, or otherwise stated the yarn is "opened." The thus opened yarn is thence fed to an area in which it is brought into confluence with a supply of staple fibers, preferably in the form of drafted or parallel fibers such as roving, for combining therewith and the combined materials are thence twisted as they pass from the combining area. This method and apparatus have generally proven quite satisfactory in producing a desirable product and in general function, as stated in the aforementioned application. However, difficulty has been encountered in some instances with the tendency of the filaments of the yarn to be broken and wound around the rotating contact member, or if previously broken filaments occur in the supply of yarn, as occasionally happens in substantially all continuous filament yarn, such will tend to be wound onto the rotating member.

In its generic aspects, this improvement comprises passing a continuous filament yarn in contact with a linearly reciprocably moving member and subsequently bringing said yarn in its resultant electrically and/or mechanically opened state into intimate contact with a supply of material, which is preferably substantially continuously arranged staple fibers preferably drafted or parallel, such as a length of roving, and subsequently twisting the composite resultant yarn of continuous filaments and staple fibers. One of several important and improved results from this improvement is in the elimination of the wrapping up of broken filaments on the moving member as tended to occur in the rotary contact member embodiment.

One embodiment of the generic invention employs a pair of members, preferably pins, to which reciprocating relative movement is imparted and which are placed in the path of a linearly moving continuous filament yarn of material spaced in the triboelectric series from the material of at least one of said members, the relative movement being linear and transverse to the normal yarn path whereby displacement, charging and relaxation are imparted to the yarn in its travel, to thereby cause and permit the yarn to open for confluence with a ribbon or other grouping of staple fibers, preferably drafted to desired density, thereafter in a combining or confluence area, and the yarn thence being twisted as a composite yarn.

In a second embodiment, continuous filament yarn is led between and in contact with a pair of members, such as tension discs, having interfacing surfaces moved in reciprocating relative motion toward and away from each other in a direction transverse to the path of the yarn contacted thereby and periodically tensioned, electrically charged, and released thereby to cause and permit the yarn to open, somewhat similarly to the functioning of the first mentioned embodiment. However, this embodiment differs from the first embodiment in that while the continuous filament yarn may also be displaced transversely to its normal path as in the first mentioned embodiment, and such may be highly desirable in some cases, such is not a necessity in most cases of use of this second embodiment as the release of tension on the yarn from its state of being pulled through the closed discs or other members to the state of being released, when the discs or other members are separated, provides sufficient relaxation and "overfeeding" of the yarn (due to an effect similar to that of release of a tensioned rubber band or length of other elastic material) in the vicinity of the charged portion to permit relaxation of and opening of the yarn filaments under the lateral opposing forces of the like charges on each of the filaments.

In a third embodiment, there is provided a member having a series of parallel serrations on its contact surface and a second member acting as a guide, these two members having relative reciprocating motion imparted thereto in a direction transverse to the normal direction of movement of a length of continuous filament. The serrations are preferably of an effective depth equal to from ½ to 1½ filament diameters, and in this preferred and most advantageous form serve to hold individual filaments as the yarn and serrated surface move relative to one another whereby the yarn is opened (i.e. filaments are separated from each other) for subsequent infusion of other material and twisting to form a composite yarn. Additionally, in some instances, it may be desirable or necessary to employ a serrated member the position of which in the triboelectric series is spaced from that of the yarn, whereby separation of the yarn is aided by the electrical charge imparted thereto in passing over the serrated member. It will also be apparent that greater serration depths may be employed, if desired; however, such will not result in as complete a separation of the filaments since two or more filaments may thus be caught and remain in each serration. It should also be noted that in this embodiment there is also a degree of "rubber band effect" similar to that occurring in the second mentioned embodiment (and to some extent in the first mentioned embodiment), and a lateral displacement of the yarn by relative movement between the serrated member and the second member of this embodiment to supply also an excess or overfeed of yarn during a portion of the relative movement of those members, somewhat similarly to, but not in as positive a manner as in the first mentioned embodiment, as well as in one possible arrangement of the second mentioned embodiment wherein a yarn guide is held stationary in spaced apart relation to the one or both of the interfacing members which is reciprocably moved.

In a further modified embodiment of the invention a hybrid of examples one and three is utilized wherein relative reciprocating movement is imparted to a pair of spaced apart members and an adjacent third guide member or members, the pair of members being held in fixed spaced relation to one another during relative motion between the pair of members and the third member. In this modification the yarn passes between the two members of the pair and also in contact with the third member. The yarn thus is displaced from one side to the other out of its normal path and is relaxed intermittently during the first half of each return stroke in the reciprocation cycle in each direction. This modification differs from the third embodiment in that there is no mechanical separation as occurs through use of the serrated member, and it differs from the first embodiment in that the yarn is displaced on each reciprocating stroke, or otherwise stated, twice in each reciprocating cycle of one stroke in each direction, with consequent halving of the number of reciprocation strokes per unit of time required and with reduction in wear as would occur with the use of only one moved member as in the first mentioned embodiment. It is necessary in this modification as in the first and second mentioned embodiments that the yarn and at least one or both of the pair and the single guide member or members past which the yarn moves be of, or have a yarn engaging surface of, a material separated from the material of the yarn filaments in order to produce the necessary electrical charge on the yarn for electrostatic separation, and/or the yarn may be charged in any one of the embodiments, if desired, by providing an electrodynamic potential on one of the relatively moving members or sets of members in lieu of or in addition to using materials different in the triboelectric series. It will readily be apparent, however, that for most purposes the use of a triboelectrically separated static charging source, rather than an electrodynamic charging source, is most highly desirable. Also, in order to achieve the desired separation of the filaments it is necessary in this, as well as the first embodiment that the speed of relative movement of the members during at least a portion of each return stroke be greater than the rate of lateral return movement of the filament yarn due to the rate of take-up of the filament yarn therefrom to thereby produce the relaxation necessary for electrostatic opening. Also, in the third mentioned embodiment such speed differential is necessary if separation of the filaments is to be aided or partially achieved through electrostatic repulsion.

In order to achieve maximum effectiveness of opening of the continuous filament yarn in accordance with this invention, it is desirable that a yarn with little or no twist be employed, since otherwise there will be positions where non-opening or only slight opening occurs, which for most uses of a continuously combined composite yarn would be unsatisfactory.

The foregoing and other features and advantages of the invention will readily become apparent from the following detailed description of several illustrative physical embodiments thereof, taken in conjunction with the accompanying drawings, wherein Figure 1 is a schematic illustration of one embodiment of the invention;

Figures 2–4 are plan views of the yarn opening, or otherwise stated tensioning, charging and release mechanism, of Figure 1, shown in three different positions which it assumes during each cycle of alternate tensioning, charging and release of the yarn;

Figure 5 is a schematic view of a modified form of the invention;

Figures 6–8 are plan views illustrating positions of the yarn tension charging and release mechanism of Figure 5 during various phases of its operation;

Figure 9 illustrates an alternative actuating apparatus for a disc type opening assembly, as in Figure 5;

Figure 10 illustrates a third general embodiment of the invention;

Figure 11 is a diagrammatic illustration in longitudinal cross section of the opening assembly of Figure 10, illustrating the longitudinal yarn path therethrough;

Figure 12 is a schematic view of a further modification, or fourth embodiment, of the invention;

Figures 13–15 illustrate schematically in plan view various positions of the yarn opening means of the embodiment of Figure 14 during its various phases of operation; and Figure 16 illustrates an additive modification which may be employed with any one of several of the various major embodiments of Figures 1, 5 or 12, and which for illustration is shown in conjunction with the embodiment of Figure 5.

Referring now to the figures of the drawing, in the embodiment illustrated in Figure 1, a supply of continuous filament yarn 12 in the form of a filled bobbin 14 is supported in spaced apart relation to a device, generally indicated 18, for effecting an opening of the yarn (i.e. separation of the filaments from one another). The yarn leaves the supply package 14 and passes upwardly and through a guide eye 15 and a tensioning means such as a pair of tension discs 16, and thence through guide eye 17 and downwardly to the yarn opening device 18. Thence from the yarn opening device 18, the opened yarn is fed to a confluence area where the opened continuous filaments are combined with a second supply of material, such as staple fibers which prior to combining are preferably in the form of roving 20 or other linearly continuous form, but may be in linearly discontinuous form, if desired.

The roving may be supplied from any suitable source such as a bobbin 22 filled therewith and may be fed if desired through a drafting frame, generally indicated at 24, to form a continuous supply of staple fibers of desired density compared to the rate of feed of the opened continuous filaments. The drafting frame may suitably comprise a pair of back rollers 26, an intermediate apron arrangement 27 and a pair of front or delivery rollers 28, which latter rollers preferably also form at their bite or nip the area of combining or confluence of the open continuous filaments 12 with the staple fibers 20. It is to be emphasized as of considerable importance that with this bite or nip area of confluence the filaments 12, once opened, will tend to be held open at the input side of rollers 28 by the grip thereon of the bite formed by the two rollers 28, and thus a very effective combining or confluence area is formed.

The combined continuous filaments and staple fibers emerge from the area of confluence on the delivery side of rollers 28 and are thence twisted and wound, as with a conventional down-twister arrangement 30 onto a suitable holder such as bobbin 32.

In this first illustrated embodiment, as shown in Figures 1–4, the yarn opening mechanism 18 comprises a pair of relatively movable members disposed transverse to the yarn path, which members preferably take the form of a pair of pins 42, 44, but may suitably take other forms such as, for example, a pair of relatively movable eyelet guides, or an eyelet guide and a pin. Preferably, there is also provided a third member adjacent the other two, which in the instant case takes the form of an entrant eyelet guide 40. Aside from its function of directing the yarn 12 so as to pass between pins 42 and 44, the eyelet guide 40 serves, by virtue of its position in relation to pins 42 and 44, the dual function of increasing the degree of overfeed of the yarn 12 for a given length of traverse stroke of pin 42 relative thereto, and also increasing the wraparound angle of the yarn about pin 42 to thereby cause a greater static charge to be imparted to the yarn 12 per reciprocating stroke of pin 42.

Pin 44 and eyelet guide 40 may be mounted in any suitable or desired manner on opposite sides of pin 42 so long as relative movement may be imparted to these respective elements. Preferably, the pin 44 and eyelet 40 are each secured to a respective stationary element on either side of pin 42 which elements, as illustrated, take the form of the upstanding legs 46, 48 of a U-shaped channel bar 50. Channel bar 50 serves as a guide support for a relatively reciprocable transverse bar 52 upon which is mounted pin 42 in any suitably secured manner.

It will be apparent that relative reciprocating motion may be imparted between pin 44 and eyelet guide 40 on the one hand and pin 42 on the other hand, either by movement of pin 42 or by movement of pin 44 and guide 40, or movement of each. However, relative movement is preferably imparted by holding pin 44 and guide 40 stationary, as shown, and reciprocating pin 42. To this end, rod 52 is reciprocably driven in any suitable or desired manner as by a motor M and suitable intermediate drive connections such as a slotted yoke follower and eccentric arrangement generally indicated at 56, for converting rotary to reciprocating motion.

In order to minimize and even out the wear on the drafting rollers 26, 28, and apron assembly 27, and thus assure continued even production of injected or infused yarn for a greater length of time without undue servicing, a reciprocating (preferably very slowly) traverse guide assembly 60 may be provided having a pair of guides thereon, one in the form of a trumpet 62 for the roving, and the other a guide eye 64 for the continuous filament yarn 12. Any suitable or desired mechanism may be provided for supporting and reciprocating the traverse guide assembly 60, such as a reciprocably driven cross bar 66. As noted above, assembly 60 is preferably moved very slowly in order not to disturb the registry of the yarn 12 with the roving 20 at the point of confluence thereof. It will be apparent also that assembly 60 being vertically aligned with respect to the converging paths of yarn 12 and roving 20 serves in this connection to keep the yarn 12 and roving 20 in alignment such that they are brought into registry with one another at the point of confluence in the area of rollers 28.

In operation, continuous filament yarn 12 is pulled from supply bobbin 14, through guide and tension assembly 15, 16, 17, through guide eye 40 and alternately between pins 42 and 44, through guide eye 64 between delivery rollers 28 where it is combined with the staple fibers of the roving 20, and thence to the twister 30 and onto takeup bobbin 32. The roving 20 is pulled from the roving supply bobbin 22 by the back rollers 26 of the drafting frame first over a guide bar 19 and through trumpet 62, thence between back rollers 26, through apron assembly 27, between delivery rolls 28, where it is brought into confluent registry with the opened continuous filaments of yarn 12, emerging from the delivery rollers in a confluent state with the yarn 12, and being twisted together with the continuous filaments by twister 30 to form a composite twisted yarn 31 which is wound onto bobbin 32.

Referring to Figures 2–4 particularly, and generally to Figure 1, the operation of opening of the continuous filament yarn 12 will be considered in more detail.

Figure 2 illustrates the assembly 18 with the pin 42 near the beginning of the positive displacement and tensioning portion of the cycle, while Figure 3 illustrates the assembly 18 at the point of maximum positive displacement and linear distortion of the yarn 12. Figure 4 shows the assembly 18 and yarn 12 in the maximum relaxed position, wherein the pin 42 is at the end of its traverse release stroke, toward the right as illustrated. The specific operation will become almost readily apparent from the schematic illustrations of these drawings; however, to assure complete understanding the complete cycle of displacement, charging, and relaxing will be described.

Yarn 12, during the first portion of the cycle, becomes engaged by pin 42 and is displaced from its linear path between guide eyelet 40 and pin 44 to thereby form a tensioned semi-loop of longitudinally progressing yarn. During this displacement and loop formation the yarn rubs in frictional contact with the surfaces of guide 40 and pins 42 and 44, under the influence of the lateral forces exerted on the yarn as a result of the longitudinal tension in the yarn and the lateral distortion thereof in passing through assembly 18. It will be noted that adequate tension to assure good frictional contact between the pins and the yarn is imparted to the yarn through the use of tension discs 16 preceding the yarn passage through the opening assembly 18. Upon reaching the end of its distorting or positive-displacement stroke the pin 42 begins its return or relaxation stroke, which may terminate substantially as shown in Figure 4. In order to achieve the most desirable opening or separation of the filaments of the yarn it is necessary that the speed of pin 42 during at least a portion of the return stroke be greater than the rate of lateral return movement of the yarn resulting from the longitudinal feeding or progressing movement through delivery rollers 28, so as to thereby permit the relaxation necessary for electrostatic opening, as shown schematically in Figure 4.

This state of operation wherein the yarn is relaxed and fully opened is also shown in Figure 1. It will be seen from Figures 1 and 4 that the relaxed yarn is open, or otherwise stated the filaments are separated, under the influence of the electrostatic repulsive forces of the electrostatically charged filaments. This open state normally extends from the opening assembly 18 to the nip area of rollers 28 during each period of relaxation. The yarn will be maintained open in the vicinity of the nip or confluent area of rollers 28 even during the period of tensioning and distorting, since after the yarn has been once opened and passes in the thus opened state through the rollers 28 these rollers will tend to hold it in substantially this form on the input side and therebetween so long as the frequency of reciprocation of pin 42 is not too slow. In general, it may be said that yarn 12 should not be longitudinally fed by rollers 28 at a rate such that a length substantially equal to or greater than the distance between rollers 28 and assembly 18 is fed past rollers 28 between periods of yarn relaxation. For best operation, the frequency of relative reciprocation of pins 42, 44 relative to the rate of yarn feed should be substantially faster than this in order to maintain the most satisfactory opened width at the nip or confluent area. This more or less completely open state only occurs for a brief instant, and with high speed operation the yarn may never reach a degree of opening of this great a magnitude, although with proper operation, as outlined above, it will be sufficiently opened to become effectively and substantially fully enmeshed with, as distinguished from being merely plied with, the roving 20 or other combining material.

In the second illustrated embodiment as shown in Figures 5–8, the yarn opening mechanism 118 comprises a pair of relatively movable members having interfacing surfaces, which preferably take the form of a pair of tension discs 134, 135, at least one of which is triboelectrically different from the yarn 112 material. One of the discs, 134, is slidably mounted on and held against axial movement beyond a set point on a reciprocably movable rod 138 in the direction away from disc 135, as by a separate slidably adjustable thrust collar 136 mounted on rod 138 and having a set screw 137. The other disc 135 is freely slidably mounted on the rod 138 in face to face relation to disc 134. The disc 135 has a sleeve bearing 139 secured thereto or formed therewith which also freely rides on rod 138 with disc 135. Disc 135 is resiliently biased toward disc 134 as by a compression spring 142 engaging at one end an adjustably fixed collar 144 on rod 138 and at its opposite end the sleeve bearing 139 of disc 135. Sleeve bearing 139 rides in an apertured or slotted bracket 146 suitably secured in any desired manner on the frame adjacent an input guide eye 140 through which the continuous filament yarn is passed to the discs 134, 135. Secured or formed on the sleeve bearing 139 in spaced apart relation from the disc 135 is a stop flange or shoulder 150 which serves to restrain the disc 135 against axial movement to the right (as seen in Figure 5) beyond a fixed point determined by the spacing between flange 150 and disc 135 and the position of bracket 146 on the frame.

Reciprocal movement may be imparted to rod 138 by a suitable means such as a motor driven rotatable eccentric 152 which engages a transversely slotted follower plate or yoke 154 attached at one end of rod 138. As will be seen in Figures 6–8, the extent of throw of rod 138 in its reciprocating travel may be arranged to be such that the discs 134, 135 will be open at one end of the rod travel (Figure 6), closed and under compression at the opposite end of travel (Figure 8), with the position of opening (during movement to the right, as shown) and closing (during movement to the left, as shown) of the discs being adjustable to occur at any desired intermediate point of the rod travel. In the illustrated arrangement, the disc 134 and collar 136 are positioned by set screw 137 on rod 138 at a point such that "opening" and "closing" of discs 134 and 135 occur at approximately the one-third point of the rod throw, and thus the discs remain in the open and closed positions for periods of time in a ratio of approximately 2:1, which has been found to be a satisfactory ratio. However, it will be apparent as the description of the function of this arrangement proceeds that a greater or less ratio between time closed and time open might be employed, if desired, to obtain more or less tensioning and electrification, or less or more time per cycle for opening of the yarn, respectively.

If desired, axial positioning of rod 138 may be accomplished as may be necessary, as by resetting a set screw or set screws 156 in follower plate 154 which serve to secure the rod 138 in a complementary slot 155 in follower plate 154. Also, tensioning and electrification of the yarn may be adjusted by adjusting spring retention collar 144 axially on rod 138 to decrease or increase the spring force exerted on the discs by spring 142 during their joint engagement with the yarn to thereby accordingly decrease or increase the friction and electrostatic charging of the yarn as it passes between the discs in their closed position.

It will be noted that due to the tensioning and pull-off regulating action of the tension disc type opening assembly 118, an input tension disc assembly, such as provided at 15, 16, 17 of the first described embodiment, may be and is omitted as superfluous, and in most cases is actually undesirable as unduly interfering with the "rubber band" effect by which periodic overfeed is obtained.

In operation, continuous filament yarn 112 is pulled from supply bobbin 114 over guide bar 115, through guide eye 140, between tension discs 134, 135, through guide eye 164, between delivery rollers 128 where it is combined with the staple fibers of the roving 120, and thence to the twister 130 and onto bobbin 132. The roving 120 is pulled from the roving supply bobbin 122 by the back rollers 126 of the drafting frame first over guide bar 119 and through trumpet 162 of traverse assembly 160, 162, thence between back rollers 126, through apron arrangement 127, between delivery rollers 128, where it is brought into confluent registry with the continuous filaments of yarn 112, emerging from the delivery rollers in a confluent state with the yarn 112, and being twisted together with the continuous filaments by twister 130 to form a composite twisted yarn 131 which is wound onto bobbin 132.

Specifically referring to Figure 6–8, the yarn 112 is first gripped (Figure 7) by the interfacing surfaces of discs 134 and 135 during the tensioning stroke (Figures 7 and 8) as rod 138 moves toward the left. During this period the yarn 112 is pulled through under tension and in frictional contact with the discs 134, 135. This frictional contact imparts an electrostatic charge to the yarn filaments. At the conclusion of this portion of the reciprocating cycle the discs separate to a point where the yarn may slip between the discs with comparatively small, and preferably negligible, resistance. The separation of the discs 134, 135 permits the tensioned yarn 112 to contract and become relaxed, during which contractive motion the yarn acts in the manner of a tensioned elastic body and overshoots, or in other words pulls an excess of supply yarn from supply bobbin 114. This excess of yarn thus permits the lateral spreading of the individual filaments of the yarn as it passes through and beyond the disc type opening assembly 118 on up to the area of confluence at the nip of rollers 128 as illustrated in Figures 5 and 6. It will be apparent that the lateral opening of the yarn takes place in this instance as in the first instance due to the influence of the repulsive forces between the individual filaments resulting from like electrical charges thereon.

In an alternative form of disc type opening assembly 218, separation of the discs may be accomplished through employment of an electromagnet arrangement, as shown schematically in Figure 9. In this arrangement a pair of tension discs 234 and 235 are mounted on a post 240 which may be fixedly supported in any suitable manner as by securing with a screw 242 and nut 243 to an angle bracket 244. Bracket 244 may in turn be attached to a frame (not shown) in a position corresponding to that shown for the opening assembly 118 in Figure 5, or otherwise as may be desired or necessary for the particular application.

Disc 235 is fixedly mounted in position on post 240 as by a forced fit thereon, or otherwise, and may be spaced from the bracket 244 as by a spacer collar 246. Disc 234 is loosely fitted onto post 240 and is resiliently biased into face-to-face engagement with disc 235 as by a coil compression spring 248 which surrounds post 240 and the extended threaded portion of screw 242. The outer end of spring 248 is tapered to engage the face of one of a pair of adjustment nuts 250 and 252, which may be moved and locked in desired position to adjust the tension on the spring 248, and thereby adjust the degree of effective frictional charge imparted to the yarn by the discs, as well as the yarn tension, etc.

Encased within a suitable protective cylindrical housing 260 is an electromagnet coil 262 of suitable wire wound on a hollow cylindrical core 264. Core 264 and housing 260 may be bonded or otherwise held together, as may be desired, in any suitable manner. Housing 260 is attached to the extended end of screw 242 as by a pair of nuts 265, 266. The energizing leads 270, 272 may suitably be brought out of housing 260 through an aperture in the end thereof.

Any of a number of make-break control circuits may be employed to alternately energize and deenergize the electromagnet coil 262, whereby the free or loose disc 234 is caused to move alternately away from and into engagement with disc 235. One suitable make-break control circuit is schematically illustrated, wherein leads 270 and 272 are in series connection with a source of D.C. current, such as a battery 274, and a cam follower switch arm 276 and associated contact 278. Arm 276 may suitably be resiliently biased normally into engagement with contact 278, as by gravity or a tension spring 280, as shown, while make-break action of the arm 276 may be controlled as by an eccentric or other suitably shaped cam 282 driven by a motor 284. By suitably shaping cam 282 any desired ratio of close-open, or tension-release, time may be obtained for discs 234 and 235.

In a third modification of the invention, as illustrated in Figure 10, the opening assembly 318 comprises a pair of relatively movable members in the form of bars 334, 335 having serrated or toothed yarn engaging surfaces 336, 337. Preferably the yarn engaging surfaces 336, 337 are relatively narrow in width in order to provide more positive yarn contact with the individual serrations, and as illustrated these surfaces may each advantageously take the form of a serrated edge of each of the relatively movable members.

The bars 334 and 335 may be mounted in any suitable manner for relative movement transverse to the normal direction of movement of the yarn 312. In the instant embodiment the bar 335 is fixedly mounted on a stationary bracket 339 with its serrated edge surface 337 facing upwardly toward and intercepting the yarn path. Bar 334 is secured to a transverse pusher rod 338 reciprocably driven by any suitable means, such as described for instance in the preceding embodiments, and is disposed with its serrated edge surface 336 facing downwardly into full interception with the yarn path and between the bar 335 and a stationary entrant guide eye 340. Preferably, the serrated edge surfaces 336 and 337 overlap to some degree, as illustrated schematically in Figure 11, in order to assure adequate yarn contact therewith, with the yarn thus being forced through a tortuous course between guide eyes 340 and 364, due to this overlapping arrangement. In order further to assure engagement of the yarn with the surfaces 336, 337, it is normally desirable to provide this embodiment with an input tensioning device, which may suitably take the form of a common disc tensioning assembly 316 with associated guide eyes 315, 317, similarly to the arrangement utilized in the embodiment of Figure 1.

The serrations on surfaces 334 and 335 are preferably of an effective depth equal to from ½ to 1½ times the individual filament diameter of the yarn for most effective results, although in practice greater depths for the serrations may be found necessary as a practical matter. If desired, and in many cases this is a preferable arrangement, one or both of the bars 334 and 335, or merely their edge surfaces 336, 337, may be formed of material triboelectrically different from the yarn material whereby separation of the yarn is aided by the electrical charge imparted thereto in passing over the serrated surface.

In order not to unduly recompress the spread apart filaments of the yarn 312 as it passes from stationary bar 335 to the delivery rollers 328, it is desirable that eyelet guide eye 364 be transversely oblong, as illustrated, particularly when little or no triboelectric charging action is employed to assist in the opening action on the yarn.

The length of the reciprocating stroke of the bar 334 may vary within considerably wide limits; however, for most practical cases it will suffice to maintain the stroke in the range of approximately ¼ inch to one inch.

It is believed that from the foregoing explanation and the illustrations in Figures 10 and 11, the operation of this modification will be readily apparent. Briefly, referring further to the operation however, it will be seen that the serrations individually serve to grasp and retain or tend to retain one or more individual filaments of the yarn, the number of filaments retained and the tendency of retention depending on the depth and contour shape of the serrations. Thus, as relative motion is effectively transmitted to the two bars 334 and 335, their respective serrated edge surfaces 336, 337 function both as yarn moving means relative to each other, and filament separating means. Under practical operating conditions the filaments will not all become laterally separated as they pass over the serrated surfaces 336 and 337; however, a considerable degree of opening, which is adequate for practical operation, is obtained and maintained by this system.

In Figure 12 an embodiment is illustrated which employs a pair of spaced apart pins 442, 443 mounted for reciprocating motion on a rod 452, reciprocably driven by any suitable means such as previously described in connection with the preceding embodiments. The yarn 412 passes between the two pins 442, 443 and through each of two eyelet guides 440 and 444 fixedly mounted on respectively opposite sides of rod 452.

The pins 442, 443 are so disposed that at the mid-position of the reciprocating stroke they present an open path between the aligned guide eyes 440 and 444, as illustrated in Figure 14. Slightly to each side of the mid-position and continuing toward and at each end of the stroke the yarn is engaged, displaced and rubbed frictionally by the pins 442 and 443 as well as by the sides of the two guides 440 and 444, as shown in Figures 13 and 15. Thus, by making any or all of the yarn contact surfaces of pins 442, 443 and guides 440 and 444 of material triboelectrically different from the yarn material it will be apparent that a similar type of opening action to that of the first described embodiment will result from this apparatus.

In the mid-position of rod 452 and pins 442, 443, the frictionally statically charged yarn filaments will repel each other and spread out or open due to their being in a somewhat longitudinally overfed and relaxed state. This relaxation and effective overfeed occurs for a brief period twice during each cycle of reciprocation in this embodiment, as does the displacement and frictional charging action on the yarn, as distinguished from the single displacement, charging and opening per reciprocating cycle occurring with the embodiment of Figure 1. This effectively tends to give twice as much charging and opening action to the yarn per cycle of reciprocation, thus permitting lower frequencies of reciprocation to be employed in this embodiment for an equivalent degree of yarn opening, as well as other advantages previously mentioned in the general description of this embodiment.

Referring to Figure 16, it has been found desirable and expedient in some instances to add a device between the opening assembly and the area of confluence for the purpose of aiding in holding the filaments of the yarn in open relation after they leave the opening assembly. Such a device is shown in Figure 16 for illustration purposes in conjunction with the embodiment of Figure 5, although it might suitably be employed with various of the other embodiments such as those of Figures 1 or 12. Like numerals are employed for all parts not requiring modification, and added or modified parts are denoted by numerals beginning with a 5.

Simply stated, the device for aiding in maintaining the filaments in open relation comprises an inverted bar member 570 having an edge surface 572, having substantially parallel serrations thereon, or other yarn engaging surface which is rough enough to tend to hold the yarn filaments against lateral movement when pressed thereagainst, yet preferably smooth enough not to seriously abrade the yarn while passing in engagement therewith. The bar member 570 may suitably be similar in design to previously described serrated bars 334 and 335, which bar extends into and slightly bends the path of the yarn from guide eye 164 to delivery rollers 128. Bar 570 may suitably be secured to slow traverse guide assembly 560 as by a depending arm bracket 574 suitably connected thereto. The entire assembly 560, as thus modified, is secured to cross bar 166 which, as in the embodiment of Figure 5, is driven in a slow reciprocating traverse motion.

In this modification the yarn 112 will during each relaxed period drop down slightly beneath the serrated edge surface 572, and due to their mutual repulsive forces the filaments will tend to open to the widest possible degree consistent with the degree of relaxed freedom. Upon the yarn being again tensioned due to the closing of discs 134 and 135 and the yarn being progressed forward by rollers 128, the thus previously opened yarn will be pulled up into contact with the serrated edge surface 572 of bar 570. A given length of yarn will obviously be progressed forward by rollers 128 during the period of tensioning and frictional contact with the yarn by discs 134, 135 as well as bar 570. However, due to the yarn filaments being pulled laterally into contact with the serrated edge surface 572 in a substantially open state upon the beginning of each tensioned portion of the cycle, the filaments will be maintained in substantially this open state during their longitudinal progression by rollers 128 due to the resistance to any reconverging action exerted by the serrated edge surface 572. In other words, during the tensioning portion of the cycle the spread out or open filaments will each tend to ride in a continuing relative position against edge surface 572 and since they are in substantially spread out relation against the serrated surface 572 at the beginning of the tension portion of the cycle, they will tend to continue spread out until the next relaxation period when they will tend to spread under their own self-repulsive influence.

If desired, in order to achieve further electrostatic charging of the yarn, the bar 570 may be made of triboelectrically different material from that of the yarn, whereby the yarn is also charged as it passes in engagement with serrated surface 572, or alternatively, this may be the sole means of charging if desired, although the latter is definitely not preferred.

By way of note with respect to each of the illustrated embodiments, it will normally be desirable to employ the arrangements in multiple form on each frame, such as illustrated particularly in Figures 1 and 5, in order to provide efficient mass production. It will readily be apparent from Figures 1 and 5, as well as the figures illustrating the other embodiments, that the various embodiments each lend themselves to multiposition side-by-side arrangement on a single frame, and it is to be understood that such arrangements are within the scope and spirit of the invention.

Obviously, further modifications will be apparent to those skilled in the art and may be made without departing from the scope or spirit of the invention, it being understood that the invention is only to be limited by the scope of the appended claims.

Having thus described our invention, we claim:

1. The process of forming a combined yarn which comprises laterally opening a plurality of substantially continuous filaments by subjecting said filaments to frictional surface contact with a reciprocating surface while simultaneously advancing said filaments in a direction transverse to the reciprocating motion and periodically relaxing said filaments whereby said filaments are spread apart transversely to the direction of advance thereof, and inserting material between said spread apart filaments.

2. The process according to claim 1 wherein said filaments are maintained in spread apart relation at the point of material insertion during unrelaxed periods thereof.

3. The process according to claim 1 wherein said filaments and said inserted material are twisted together subsequently to insertion of said material.

4. The process of forming a combined yarn which comprises subjecting substantially continuous filaments to frictional surface contact with a reciprocating surface while simultaneously advancing said filaments in a direction transverse to the reciprocating motion and periodically relaxing said filaments whereby said filaments are spread apart transversely to the direction of advance thereof, and inserting material between said spread apart filaments, said filaments being electrostatically charged through frictional moving contact with a surface triboelectrically different therefrom.

5. The process according to claim 4 wherein said triboelectrically different surface is said reciprocating surface.

6. The process according to claim 1 wherein said frictional surface contact is attained by passing said filaments between a pair of interfacing surfaces, and periodically moving said surfaces alternately toward and away from interengagement.

7. The process of forming a combined yarn which comprises subjecting substantially continuous filaments to frictional surface contact with a reciprocating surface while simultaneously advancing said filaments in a direction transverse to the reciprocating motion and periodically relaxing said filaments whereby said filaments are spread apart transversely to the direction of advance thereof, and inserting material between said spread apart filaments, said interfacing surfaces being the adjacent faces of a pair of relatively movable tension discs.

8. The process according to claim 1 wherein said frictional surface contact is attained by passing said filaments between a pair of relatively reciprocable yarn guide members, at least one of said members being a pin extending transverse to the normal filaments path adjacent thereto.

9. The process according to claim 1 wherein said frictional surface contact is attained by passing the filaments between a pair of fixedly spaced apart surfaces and a third relatively movable surface spaced apart from said pair of surfaces, and imparting relative reciprocating motion to and between said third surface and said pair of surfaces in a plane transverse to the normal path of the filaments adjacent thereto.

10. The process of forming a combined yarn which comprises subjecting substantially continuous filaments to frictional surface contact with a reciprocating surface while simultaneously advancing said filaments in a direction transverse to the reciprocating motion and periodically relaxing said filaments whereby said filaments are spread apart transversely to the direction of advance thereof, and inserting material between said spread apart filaments, said frictional surface contact being attained by passing the filaments over and in engagement with a serrated surface, said serrated surface being transverse to the normal filaments path adjacent thereto.

11. The process according to claim 10 wherein the filaments are passed over a pair of interfacing spaced apart serrated surfaces, said serrated surfaces being relatively reciprocated transversely to the normal path of the filaments adjacent thereto.

12. The process according to claim 11 wherein said serrated surfaces are spaced apart along the path of said filaments, one of said surfaces extending downwardly and the other said surface extending upwardly.

13. The process of forming a combined yarn which comprises subjecting substantially continuous filaments to frictional surface contact with a reciprocating surface while simultaneously advancing said filaments in a direction transverse to the reciprocating motion and periodically relaxing said filaments whereby said filaments are spread apart transversely to the direction of advance thereof, and inserting material between said spread apart filaments, said filaments being passed over and in engagement with a serrated surface extending transverse to the normal path of the filaments adjacent thereto, said passage of filaments over said serrated surface being accomplished subsequent to filaments passage by and in engagement with said reciprocating surface.

14. The process according to claim 13 wherein said serrated surface extends downwardly.

15. In the method of making composite yarns from a first material and substantially continuous multifilament yarn, including moving said yarn along a normal feed path, bringing said filament yarn into intimate contact with a supply of said first material, and twisting said first material and filament yarn into a composite yarn, the improvement comprising temporarily opening said yarn by reciprocably moving a member having a surface in contact, during at least a portion of its travel, with said filament yarn and transversely to said normal path thereof and transverse to said contact surface prior to bringing said filament yarn and said first material into intimate contact.

16. In the method of making composite yarns from a first material and substantially continuous multifilament yarn, including moving said yarn along a normal feed path, bringing said filament yarn into intimate contact with a supply of said first material, and twisting said first material and filament yarn into a composite yarn, the improvement comprising opening said filament yarn by reciprocably moving a member having a surface in contact, during at least a portion of its travel, with said filament yarn and transversely to said normal path thereof and transverse to said contact surface prior to bringing said filament yarn and said first material into intimate contact, and holding said yarn against transverse movement in one direction at a point closely adjacent the point of contact with said yarn of said transversely movable member.

17. In the method of combining staple fibers with continuous multifilament yarn the improvement which comprises opening said multifilament yarn by reciprocably moving a first member relative to a second member, moving said filament yarn past and in contact with said members in a path normally transverse to the direction of said relative movement of said member, bringing said fibers and filaments into intimate contact with each other at a subsequent point in the path of said continuous filament yarn, and thereafter twisting said fibers and continuous filament yarn as a single composite yarn.

18. In an apparatus having a pair of delivery rolls, means for rotating said delivery rolls, means for guiding first and second separate bodies of material into contact one with the other in an area at the nip of said rolls, one of said bodies of material being continuous multifilament yarn, the improvement of a device for opening said multifilament yarn prior to its contact with said other body of material and comprising a member reciprocably movable in a path transverse to and intercepting the normal yarn path adjacent thereto, the path of said yarn being contiguous to at least a portion of the path of a surface of said member, and means for reciprocably moving said member.

19. Apparatus according to claim 18 wherein said reciprocably movable member is a tension disc, and wherein there is further provided a second member having a surface interfacing the face of said tension disc, and means for imparting relatively reciprocating motion between said disc and said second member transversely to the normal yarn path adjacent thereto.

20. In an apparatus having a pair of delivery rolls, means for rotating said delivery rolls, means for guiding first and second separate bodies of material into contact one with the other in an area at the nip of said rolls, one of said bodies of material being continuous multifilament yarn, the improvement comprising a member reciprocably movable in a path transverse to and intercepting the normal yarn path adjacent thereto, the path of said yarn being contiguous to at least a portion of the path of a surface of said member, and means for reciprocably moving said member, said member having a serrated yarn engaging surface.

21. In an apparatus having a pair of delivery rolls, means for rotating said delivery rolls, means for guiding first and second separate bodies of material into contact one with the other in an area at the nip of said rolls, one of said bodies of material being continuous multifilament yarn, the improvement comprising a member reciprocably movable in a path transverse to and intercepting the normal yarn path adjacent thereto, the path of said yarn being contiguous to at least a portion of the path of a surface of said member, and means for reciprocably moving said member, a serrated yarn engaging member spaced along the yarn path at a point subsequent to the point of passage by and in engagement with said reciprocably movable member.

22. Apparatus according to claim 18 comprising a pair of yarn engaging relatively reciprocable yarn engaging surfaces, one of said surfaces being a surface on said reciprocably movable member, said surfaces being formed on a pair of guide members, at least one of said guide members being a pin.

23. Apparatus according to claim 22 wherein there is further provided a second pin, said pins being fixedly spaced apart transversely to the normal yarn path.

24. Apparatus according to claim 18 wherein said means for reciprocably moving said member comprises an electromagnet and means for periodically energizing said electromagnet.

25. Apparatus according to claim 18 wherein said means for reciprocably moving said member comprises a cam and cam follower, and means for moving said cam.

26. Apparatus for opening continuous multifilament yarn comprising a first member for yarn contact therewith, a second member, means for advancing yarn in a path which is contiguous to a surface of each of said members, and means for moving said second member transversely of said yarn path in a reciprocating straight line path, each of said members having a yarn engaging surface which is inoperative to sever said yarn during normal operation, at least one of said members having a yarn contact surface of material spaced apart in the triboelectric series from the material of said yarn.

27. In an apparatus for integrating, in a predetermined confined area, selected fibers with a strand having a plurality of continuous filaments and having continuous filament supply means, fiber supply means, and means for associating said filaments in said confined area; the improvement comprising a plurality of relatively movable members, at least one of said members having a friction surface of material separate in the triboelectric series from the material of which said filaments are composed, said one member being reciprocably movable in a transverse path relative to the path of feed movement of said strand.

28. Apparatus for opening yarn comprising a pair of members, said members being relatively movable into contiguous face to face relation, means adapted to intermittently and alternately impart relative movement between said members into and out of face to face contiguous relation, and means for longitudinally moving yarn between said faces, the yarn engaging surface of at least one of said members being spaced in the triboelectric series from the material of the yarn being opened.

References Cited in the file of this patent

UNITED STATES PATENTS

| | | |
|---|---|---|
| 5,801 | Colver | Sept. 26, 1848 |
| 21,983 | Shelby | Nov. 2, 1858 |
| 2,120,270 | Tucker | June 14, 1938 |
| 2,552,210 | Parker | May 8, 1951 |
| 2,601,394 | Hansen | June 24, 1952 |
| 2,746,091 | Tissot et al. | May 22, 1956 |
| 2,825,199 | Hicks | Mar. 4, 1958 |